US010525854B2

(12) United States Patent
Alexander et al.

(10) Patent No.: US 10,525,854 B2
(45) Date of Patent: Jan. 7, 2020

(54) ADJUSTABLE SEAT

(71) Applicant: Dowco, Inc., Manitowoc, WI (US)

(72) Inventors: Jon Alexander, Kewaskum, WI (US);
Dana Homb, Two Rivers, WI (US);
Bradley Prey, Green Bay, WI (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 16/233,599

(22) Filed: Dec. 27, 2018

(65) Prior Publication Data

US 2019/0202325 A1    Jul. 4, 2019

Related U.S. Application Data

(60) Provisional application No. 62/612,764, filed on Jan. 2, 2018.

(51) Int. Cl.
| | | |
|---|---|---|
| *B60N 2/52* | (2006.01) | |
| *B60N 2/66* | (2006.01) | |
| *B60N 2/38* | (2006.01) | |
| *B60N 2/50* | (2006.01) | |
| *B60N 2/42* | (2006.01) | |
| *B60N 2/02* | (2006.01) | |

(52) U.S. Cl.
CPC ........... *B60N 2/525* (2013.01); *B60N 2/0232* (2013.01); *B60N 2/38* (2013.01); *B60N 2/42* (2013.01); *B60N 2/504* (2013.01); *B60N 2/665* (2015.04)

(58) Field of Classification Search
CPC ........ B60N 2/665; B60N 2/525; B60N 2/504; B60N 2/7082; A47C 7/467; A47C 7/54

USPC ......................................... 297/284.6, 452.41
See application file for complete search history.

(56) References Cited

U.S. PATENT DOCUMENTS

| | | | |
|---|---|---|---|
| 2,684,672 A | 7/1954 | Summerville | |
| 3,792,501 A | 2/1974 | Kery | |
| 4,514,010 A | 4/1985 | Sabater Gonzalez | |
| 4,796,955 A | 1/1989 | Williams | |
| 4,826,249 A | 5/1989 | Bradury | |
| D315,255 S | 3/1991 | Beermann | |
| 5,005,904 A * | 4/1991 | Clemens | A47C 7/467 141/114 |
| D317,534 S | 6/1991 | Hansel | |
| 5,082,326 A * | 1/1992 | Sekido | B60N 2/914 297/284.6 |
| 5,280,997 A * | 1/1994 | Andres | A47C 7/467 297/284.9 |
| 5,354,117 A | 10/1994 | Danielson | |

(Continued)

FOREIGN PATENT DOCUMENTS

| | | |
|---|---|---|
| CA | 152999 | 9/2014 |
| CA | 153000 | 9/2014 |

(Continued)

OTHER PUBLICATIONS

International Search Report and Written Opinion from PCT/US2013/059372 dated Apr. 15, 2014.

*Primary Examiner* — Syed A Islam
(74) *Attorney, Agent, or Firm* — Shane Delsman; Godfrey & Kahn, S.C.

(57) ABSTRACT

This invention is a seat with an adjustable back and/or an adjustable base. The adjustable back and/or base can be adjusted in response to rough terrain or water encountered by a vehicle in which the seat is located.

18 Claims, 11 Drawing Sheets

(56) References Cited

U.S. PATENT DOCUMENTS

| | | | |
|---|---|---|---|
| 5,461,741 A * | 10/1995 | Graebe | A47C 4/54 |
| | | | 5/654 |
| 5,529,377 A * | 6/1996 | Miller | A47C 4/54 |
| | | | 297/284.6 |
| 5,556,169 A | 9/1996 | Parrish | |
| 5,662,384 A | 9/1997 | O'Neill | |
| 5,772,280 A * | 6/1998 | Massara | B60N 2/2222 |
| | | | 297/216.12 |
| 5,772,281 A * | 6/1998 | Massara | B60N 2/643 |
| | | | 297/284.4 |
| 5,826,937 A * | 10/1998 | Massara | B60N 2/23 |
| | | | 297/284.6 |
| 5,879,053 A | 3/1999 | Lux et al. | |
| D439,775 S | 4/2001 | Sauey et al. | |
| D453,078 S | 1/2002 | Yamazaki et al. | |
| 6,783,184 B2 | 8/2004 | DiBattista | |
| D504,579 S | 5/2005 | Beermann et al. | |
| D506,084 S | 6/2005 | Beermann et al. | |
| 7,059,678 B1 | 6/2006 | Taylor | |
| D534,005 S | 12/2006 | Beermann | |
| 7,152,920 B2 * | 12/2006 | Sugiyama | B60N 2/002 |
| | | | 297/284.6 |
| D534,732 S | 1/2007 | Chen | |
| D536,185 S | 2/2007 | Ritzel | |
| D562,576 S | 2/2008 | Ritzel | |
| D574,619 S | 8/2008 | Maezono | |
| D576,413 S | 9/2008 | Arnaout | |
| 7,427,109 B2 | 9/2008 | Embach | |
| 8,033,600 B2 | 10/2011 | Reynolds | |
| D655,097 S | 3/2012 | Paetzel | |
| D656,751 S | 4/2012 | Levorato et al. | |
| D657,579 S | 4/2012 | Klein | |
| 8,181,292 B1 | 5/2012 | Pellettiere | |
| D665,181 S | 8/2012 | Crepeau | |
| 8,342,607 B2 | 1/2013 | Hofmann | |
| D694,031 S | 11/2013 | Ritzel | |
| D704,489 S | 5/2014 | Menne, III | |
| 8,733,843 B2 | 5/2014 | Franz | |
| D718,562 S | 12/2014 | Menne, III | |
| 8,944,504 B2 | 2/2015 | Zimmerman | |
| 9,896,003 B2 * | 2/2018 | Tamura | B60N 2/2222 |
| 10,166,900 B2 * | 1/2019 | Line | B60N 2/643 |
| 2001/0030459 A1 | 10/2001 | Huse | |
| 2002/0125758 A1 | 9/2002 | Ducan | |
| 2003/0038517 A1 * | 2/2003 | Moran | B60N 2/914 |
| | | | 297/284.3 |
| 2004/0021361 A1 | 2/2004 | Park | |
| 2005/0051926 A1 | 3/2005 | Guillot et al. | |
| 2005/0067868 A1 * | 3/2005 | Kern | F16K 11/0716 |
| | | | 297/284.6 |
| 2008/0088168 A1 | 4/2008 | Beermann et al. | |
| 2010/0244504 A1 * | 9/2010 | Colja | A61H 9/0078 |
| | | | 297/180.1 |
| 2011/0025111 A1 | 2/2011 | Allred | |
| 2013/0134764 A1 | 5/2013 | Groh | |
| 2015/0118426 A1 | 4/2015 | Roberts | |
| 2015/0224899 A1 | 8/2015 | Menne | |

FOREIGN PATENT DOCUMENTS

| | | |
|---|---|---|
| DE | 19938698 | 2/2001 |
| DE | 102004008407 | 8/2005 |
| DE | 102009012693 | 10/2010 |
| EP | 1077154 | 2/2001 |
| EP | 1839832 | 10/2007 |
| EP | 2230126 | 9/2010 |
| FR | 2813827 | 3/2002 |
| MX | 41918 | 7/2014 |
| MX | 41927 | 7/2014 |
| WO | 2014043303 | 3/2014 |
| WO | PCT/US2013059372 | 3/2014 |

* cited by examiner

ADJUSTABLE SEAT

CROSS REFERENCE TO RELATED APPLICATION

This application claims the benefit of U.S. Provisional Patent Application Ser. No. 62/612,764 filed on Jan. 2, 2018, the disclosure of which is hereby incorporated by reference herein in its entirety for all purposes.

FIELD OF THE INVENTION

The present invention relates generally to the field of seating. More particularly, the present invention relates to seating that can be adjusted.

BACKGROUND

With recreational vehicles, such as all-terrain vehicles, utility task vehicles, marine vehicles, motorcycles, etc., most operators and other occupants will experience a jarring and jostling resulting from rough terrain, such as muddy paths, rough roads, water, such as waves, etc. Recreational and/or unexperienced occupants may not properly brace themselves for such jarring and jostling while seated, instead leaving the upper body in an unsupported, upright position, using body muscles to control the body's movement. In doing so, the muscle groups in the body are strained to hold the occupant upright while the vehicle encounters rough terrain or water. This repetitive jarring and jostling of the occupant during use of the vehicle or strained muscles after such use may leave such occupants with a bad experience from the use of the vehicle and may result in a lessening of the use of such vehicles.

More experienced users or occupants, may try to better brace themselves from such jarring and jostling while seated by having both feet firmly planted on the floor, the upper body leaned forward and both hands firmly grasping a fixed point, for example a handle, console, seat or other vehicle structure. Although this position lessens the impact of such jarring and jostling, keeping the upper body in the forward position during such jarring and jostling uses various muscle groups as it is not a natural position. Being in the forward position for periods of time can still result in soreness or fatigue which can result in professionals, e.g. racers, outdoorsmen, hunters, fishermen, etc., not being in optimal condition during later use of the vehicle and could affect performance.

During such jarring and jostling, it is not uncommon for occupants to bounce or have an up and down motion in the seat. After some length of such use, the foam in the base of the seat will begin to degrade or compress resulting in less cushioning and support and thereby allowing occupants to "bottom out" on the hard frame of the seat. Occupants may attempt to overcome the bottoming out by providing support with their legs. This can result in discomfort or pain or muscle soreness, any of which can may leave such occupants with a bad experience from the use of the vehicle and may result in a lessening of the use of such vehicles.

As such, there is a need for a seat with a back, the orientation of which that can be adjusted. There is also a need for a seat with a base, the support of which can be adjusted.

It will be understood by those skilled in the art that one or more aspects of an adjustable seat can meet certain objectives, while one or more other aspects can lead to certain other objectives. Other objects, features, benefits and advantages of an adjustable seat will be apparent in this summary and descriptions of the disclosed embodiments, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

The accompanying drawing figures, which are incorporated in and constitute a part of the description, illustrate several aspects of an adjustable seat, and together with the description, serve to explain the principles of an adjustable seat. The following description is based on embodiments of an adjustable seat and should not be taken as limiting the adjustable seat with regard to alternative embodiments that are not explicitly described herein. A brief description of the figures is as follows.

In view of the many possible embodiments to which the principles of the present invention may be applied, it should be recognized that the embodiments described herein with respect to the drawing figures are meant to be illustrative only and should not be taken as limiting the scope of the invention.

DETAILED DESCRIPTION

In the embodiment seen in FIGS. 1-8, there is a seat or chair 10 with a base 12 and an adjustable back 14. Although in FIGS. 1-8, the base 12 and the adjustable back 14 are part of the same seat 10, such a seat could include only the base or the adjustable back individually and separately as desired.

In the embodiment seen in FIGS. 1-8, the seat 10 includes a frame or shell 16 to which the base 12 and/or the adjustable back 14 are attached. In the embodiment seen in FIG. 7, the frame 16 is a rotomolded frame with a cavity, opening or cavities formed therein. However, other methods of creating a frame or frame for a seat are known in the industry, for example, injection molding, tubes, pipes, etc., the use of which would not defeat the spirit of the invention.

The frame 16 has a first portion 18 that is the portion forming the area of the seat 10 used to sit and a second portion 20 that is the backside and/or underside of the seat. In one embodiment, a compressible material, for example a foam material, 22 is attached to the first portion 18 of the frame, for example, by gluing. However, other materials (or no materials) could be used to add comfort and/or performance to the seat 10, for example cotton, cellulose, etc., the use of which would not defeat the spirit of the invention. Further, other means of attaching foam to a frame are known in the art, for example, stapling, screwing, etc., the use of which would not defeat the spirit of the invention. A cover material 24 can be placed over the foam material 22 to achieve any desired functions, including performance (e.g. durability, quick-drying, etc.), comfort (e.g., soft, resilient, etc.) and aesthetics. In one embodiment the cover material is a vinyl material.

In one embodiment, the base 12 is an adjustable base, seen in the embodiment of FIGS. 7-8, which has or includes a base bladder or inflatable member 26 that can be adjusted, as described further below, to dampen jarring and jostling when the vehicle to which the seat 10 is attached is being used, e.g. an ATV on a rutted trail or a boat going over waves.

The base bladder 26 could be attached to the frame 16 in a number of known ways, for example, by bolts through openings formed in the bladder, the use of which would not defeat the spirit of the invention. In the embodiment seen in FIG. 7, the adjustable base 12 can include a base board 28, which can be made from any desired material and in one embodiment is made from a high-density polyethylene. A cover material 24 is stretched over the base bladder and the cover material is attached to the base board 28, such as by staples. The base board 28 is attached to the frame 16, such as by fasteners. Other means of attaching a base board to a frame are known in the art, for example, stapling, gluing, welding, riveting, etc., the use of which would not defeat the spirit of the invention. Attaching the base bladder 26 to the base board 28 by a cover material 24 allows the base bladder 26 to be inflated and deflated while inhibiting the top of the base bladder from doming upward.

The adjustable base 12 can also include a leg bolster 30, which in one embodiment is made from foam material 22, although, as discussed above, other soft or compressible materials could be used without defeating the spirit of the invention. In the embodiment seen in FIG. 7, the cover material 24 covers a top of and attaches the base bladder 26 and the leg bolster 30 to the base board 28. The base bladder 26 could also be covered by foam and/or any other material desirable for comfort and/or functionality.

The use of the foam material 22 in the base 12 of the seat 10, for example on the frame 16 and/or leg bolster 30, helps provide additional support and comfort to the seat occupant as well as allowing the base bladder 26 to be smaller (less expensive to manufacture) and quicker to inflate and deflate in response to changing terrain or water conditions. However, more or all of the adjustable base 12 (and leg bolster 30) could be made up of the base bladder 26.

In the embodiment seen in FIGS. 7-8, the adjustable back has a back bladder or inflatable member 32 that is positioned between the adjustable back and the frame 16, and which can be adjusted, as described further below, to dampen jarring and jostling and support the user when the vehicle to which the seat 10 is attached is being used, e.g. an ATV on a rutted trail or a boat going over waves.

The back bladder 32 could be attached to the frame 16 in a number of known ways, for example, by bolts through openings formed in the bladder, the use of which would not defeat the spirit of the invention. In the embodiment seen in FIG. 9, the back bladder 32 is attached to the first portion 18 of the frame 16 using fasteners 36, for example, plastic Christmas tree clips, which provide anchor points to limit the movement of the back bladder during inflation and deflation. Although Christmas tree clips are used in one embodiment, alternative methods of attaching a bladder to a frame are known in the industry, e.g. gluing, welding, etc., and other fasteners are known in the industry, e.g. rivets, screws, bolts, hooks and loops, etc., the use of which would not defeat the spirit of the invention.

Figure 9:
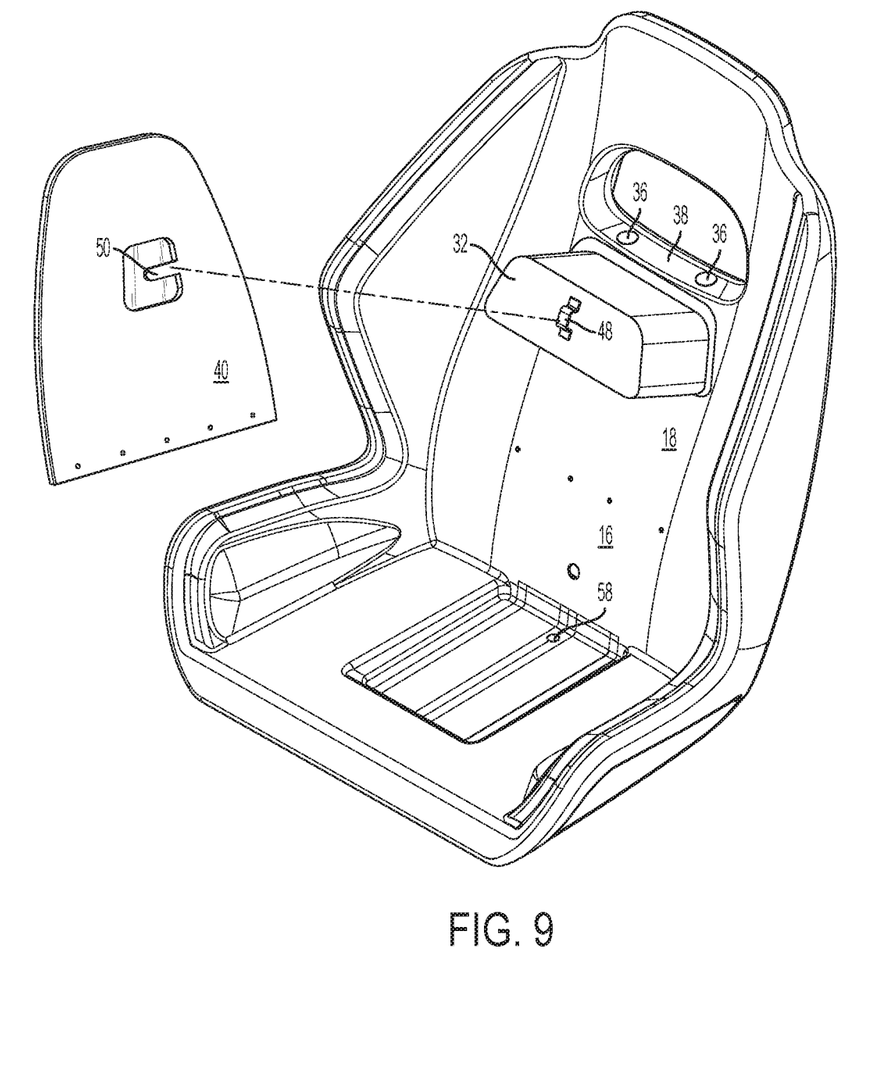
FIG. 9 is a perspective view of the frame of the seat with the back bladder attached to the frame.

In one embodiment seen in FIG. 9, the back bladder 32 has a flange 38 and the fasteners 36 extend through the flange and into the frame 16. Although one side of the back bladder 32 is shown with a flange 38, more or all sides of the back bladder could be attached to the frame to secure the back bladder to the frame.

Figure 7:
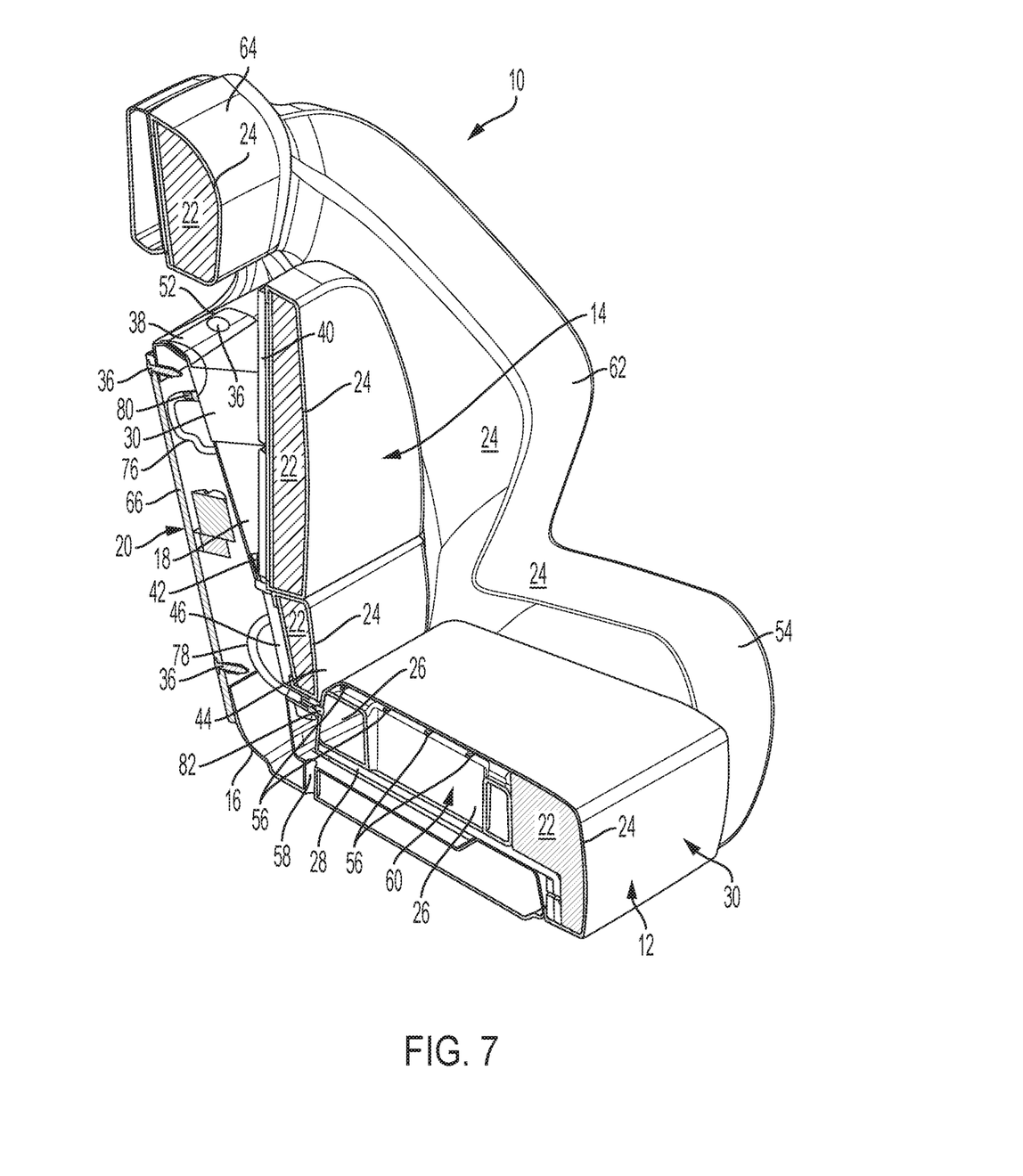
FIG. 7 is a cross-sectional perspective view of the seat of FIG. 4 taken along the line 7-7.
Figure 8:
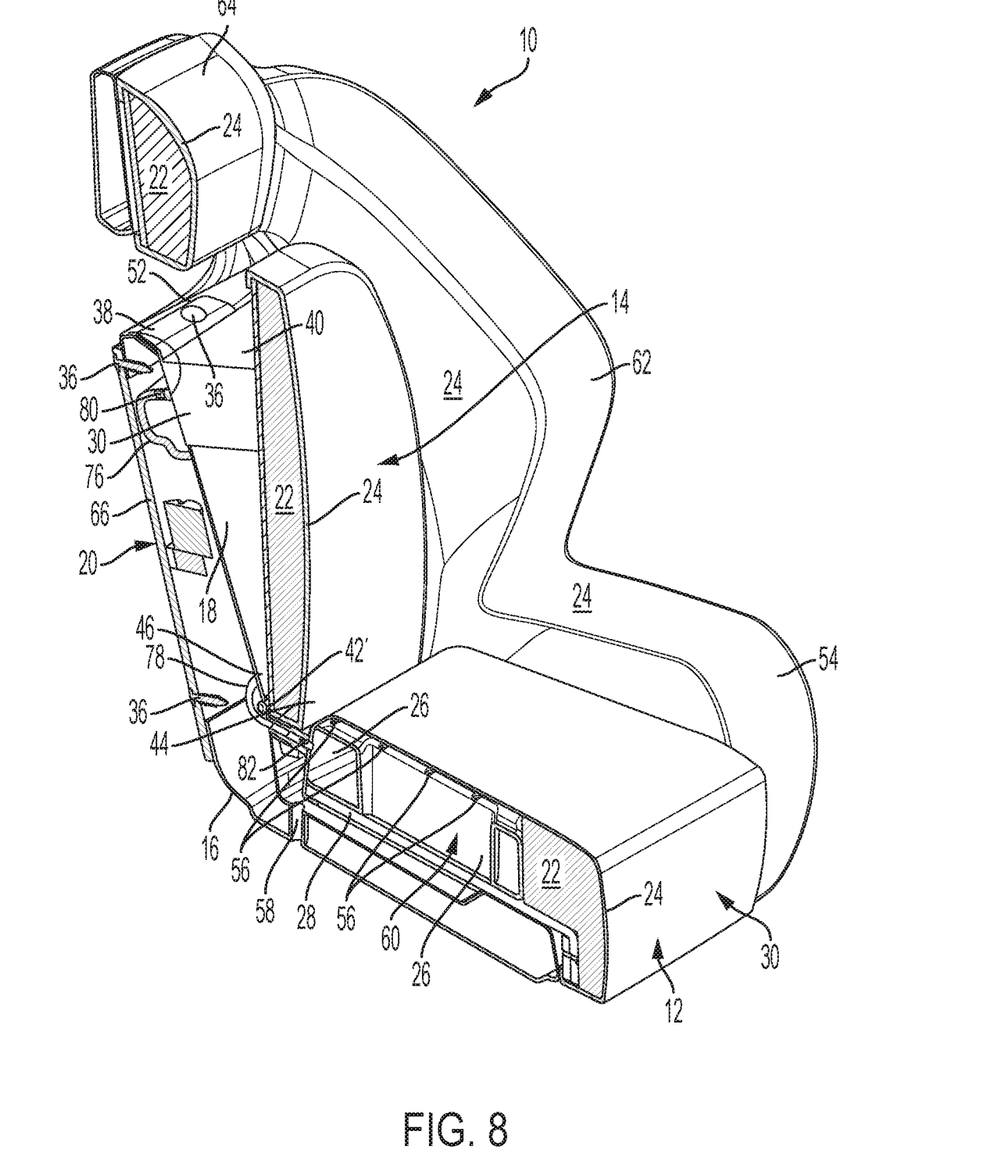
FIG. 8 is a cross-sectional perspective view of the seat of FIG. 7 with the hinge located closer to the base.

In the embodiment seen in FIG. 7, the adjustable back 14 can include a back board 40, which can be made from any desired material and in one embodiment is made from a high-density polyethylene. A foam material 22 is attached to the back board 40 and a cover material 24 is stretched over the top of the foam material 22 and is attached to the back side of the back board 40, such as by staples. The foam material 22 can be attached or connected to the back board 40 by the cover material 24 and/or by other known means of attaching a foam material to a board for example, stapling, gluing, welding, riveting, etc., the use of which would not defeat the spirit of the invention.

A hinge 42 pivotally and/or rotatably attaches or connects the back board 40 to the frame 16. In one embodiment the hinge 42 is riveted to the back board 40 and to the frame 16; however, other means are known for attaching a hinge to a board and/or frame, for example, screws, bolts, glue, etc., the use of which would not defeat the spirit of the invention. Further, the hinge could be connected between the adjustable back 14 and the base 12 or the base portion of the seat without defeating the spirit of the invention.

In the embodiment seen in FIG. 7, the hinge 42 is a living hinge that is urged towards a closed position, such that the back board 40 is proximate the frame 16. However, other means are known for pivotally and/or rotatably connecting a board to frame, for example, other hinges (butt, pivot, gate, etc.), sockets, springs, resilient member, etc., the use of which would not defeat the spirit of the invention. For example, in FIG. 8 a barrel hinge 42' is shown.

In the embodiment seen in FIG. 7, the hinge 42 is located part way up the back portion of the seat 10 from or remote from the base 12. Locating the hinge 42 part way up the back portion of the seat 10 better supports an occupant's back. For example, when an occupant leans forward in a sitting position, the entire back from the hips up does not rotate forward. Instead, the mid and upper back rotate forward. Locating the hinge 42 part way up the back portion of the seat 10 follows and supports an occupants back when the top of the adjustable back 14 is rotated or pivoted away from the frame 16. However, the hinge 42 could be located anywhere along the back portion of the frame 16, one example of which is seen in FIG. 8, wherein the hinge is located at the bottom of the back portion of the frame 16.

In the embodiment seen in FIG. 7, a lower back portion 44 is positioned between the adjustable back 14 and the base 12. A foam material 22 is attached to a lower back board 46, which can be made from any desired material and in one embodiment is made from a high-density polyethylene, and a cover material 24 is stretched over the foam material 22 and is attached to the lower back board 46, such as by staples. The foam material 22 can be attached to the lower back board 46 by the cover material 24 and/or by other known means of attaching a foam material to a board for example, stapling, gluing, welding, riveting, etc., the use of which would not defeat the spirit of the invention. The lower back board 46 is attached to the frame 16, such as by fasteners. Other means of attaching a lower back board to a frame are known in the art, for example, stapling, gluing, welding, riveting, etc., the use of which would not defeat the spirit of the invention. Alternatively, the lower back portion 44 may be formed with a lower back board 46 as seen in FIG. 8.

The first or back bladder 32 may also be attached to the adjustable back 14 to further secure the back bladder. In FIG. 9, the back board 40 may have a tab 50, such as a milled tab, and the back bladder 32 may have a strap 48 that fits around the tab on the back board 40 to connect or attach the back bladder to the back board. However, other means are known for attaching a bladder to a board, for example, fastening a flange, gluing, welding, etc., the use of which would not defeat the spirit of the invention. As the back bladder 32 is inflated or deflated, as will be discussed further below, the top of the back board 40 will be rotated out, away from the frame 16, to promote a proper upper body angle for the seat occupant as seen by comparing FIGS. 1 and 3.

As seen in FIG. 7, a webbing 52 or other cover material 24 may be used to enclose the opening between the frame 16 and the back board 40 both for aesthetical purposes and to prevent foreign debris or water from entering the area. If the webbing 52 is a stretchable material, for example, a four way stretchable material, it may also help deflate the back bladder 32 by squeezing the back bladder between the frame 16 and the back board 40.

Figure 1:
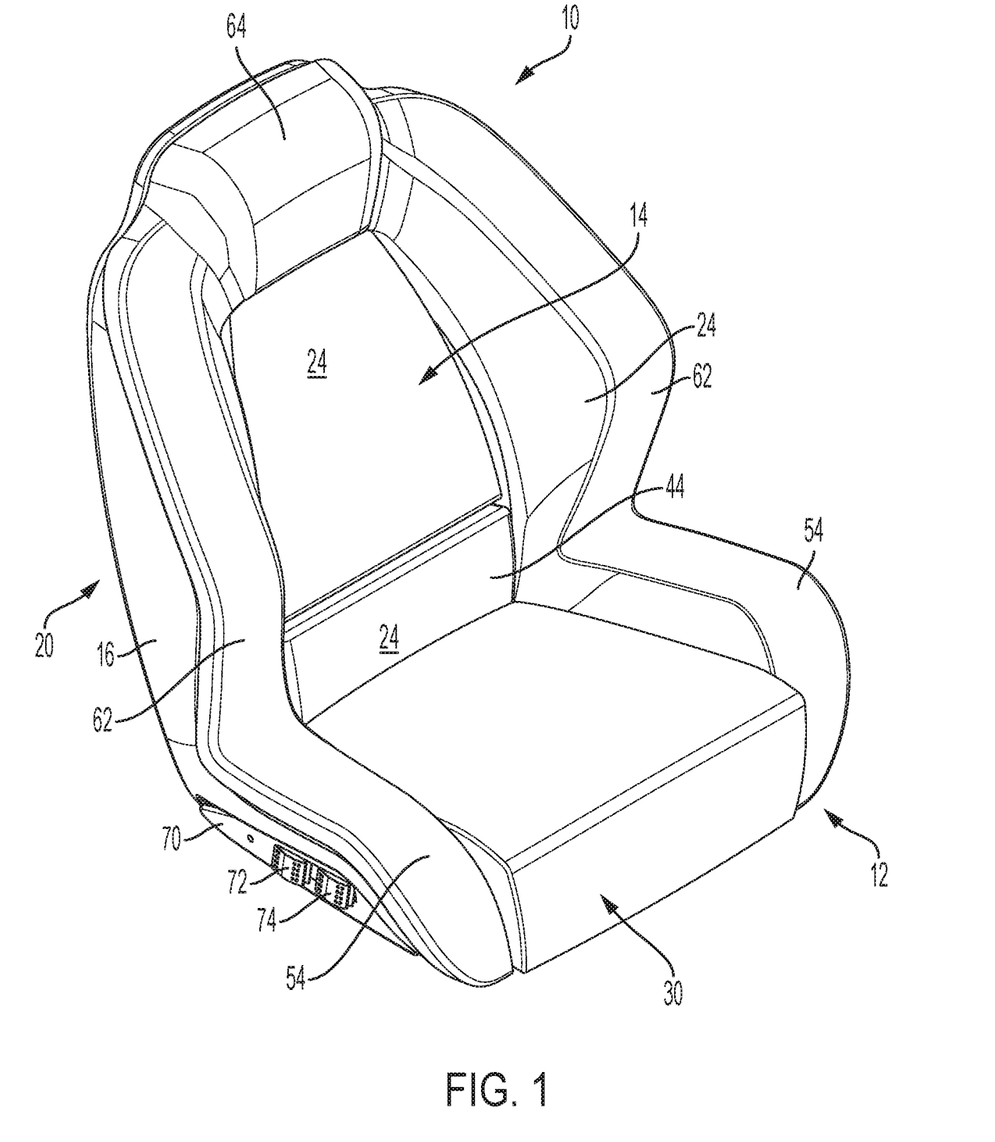
FIG. 1 is a perspective view of a seat with the adjustable back collapsed.

In some embodiments, such as the one shown in FIG. 1, the frame 16 includes side portions 54 on opposite sides of the base or second bladder 26. The side portions may extend above a top surface of the base bladder 26, to provide lateral support to the upper legs and/or midsection of an occupant, such as preventing the occupant from sliding off the seat.

Figure 2:
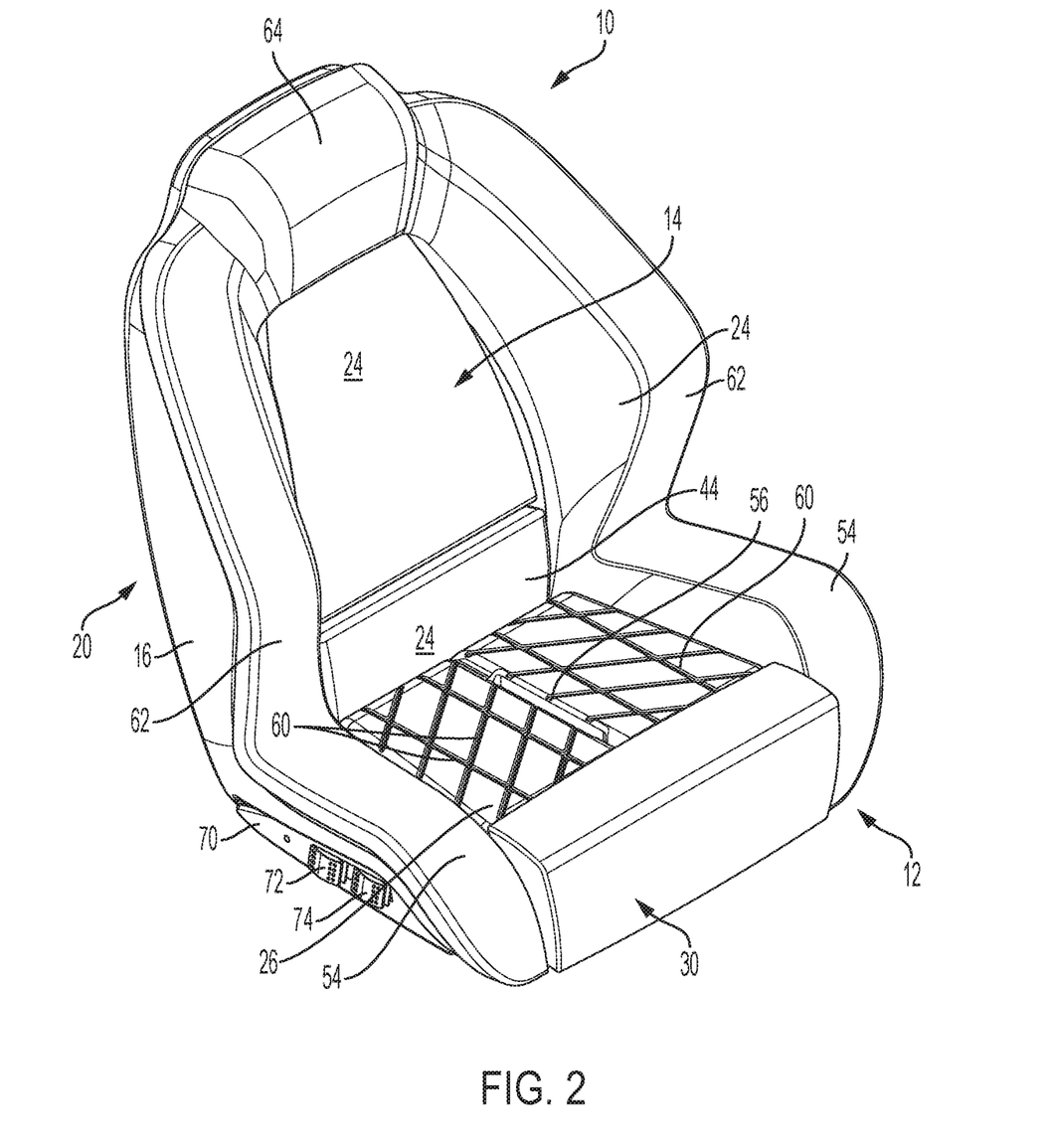
FIG. 2 is the seat of FIG. 1 with the cover material removed from the base.
Figure 3:
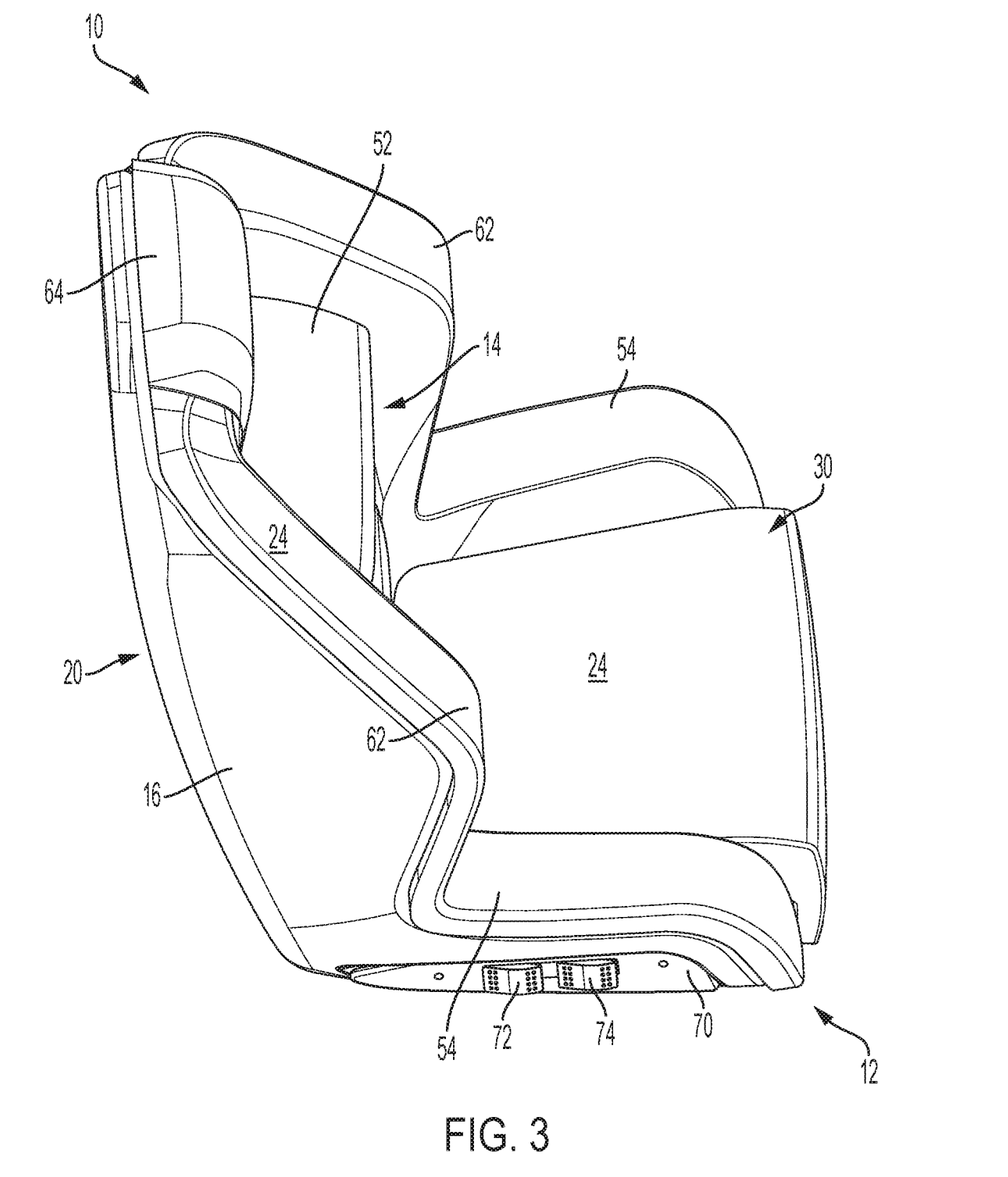
FIG. 3 is a perspective view of the seat with the adjustable back rotated away from the frame.
Figure 4:
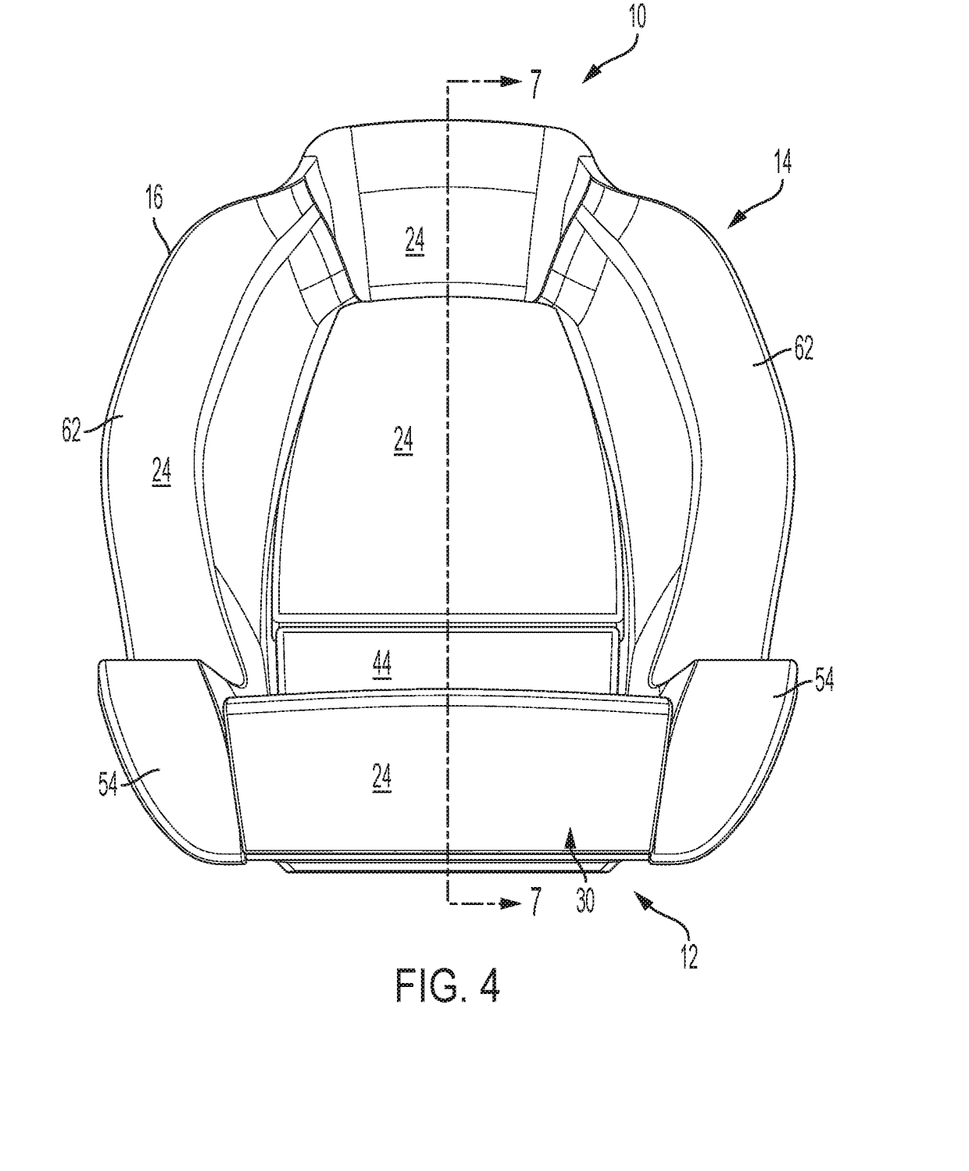
FIG. 4 is a front elevation view of the seat with the adjustable back collapsed.
Figure 5:
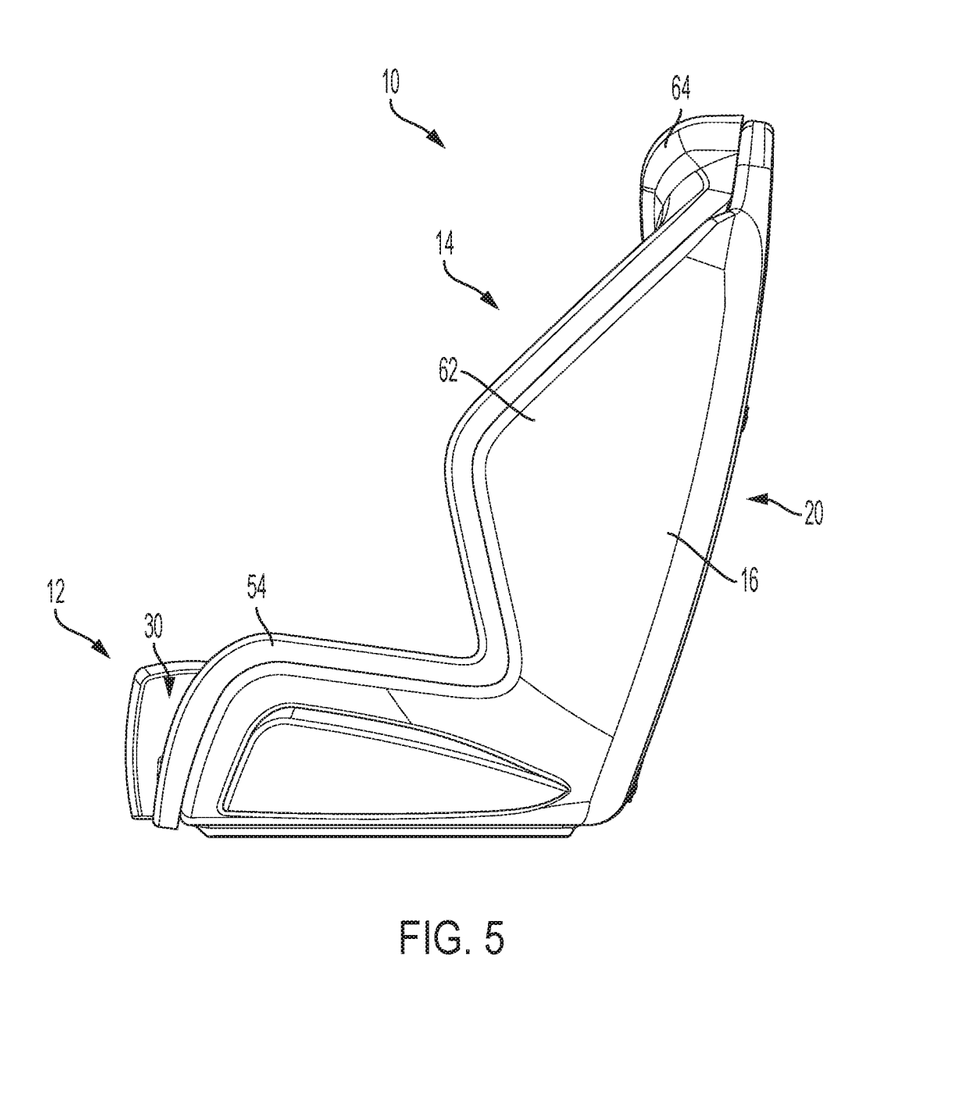
FIG. 5 is a side elevation view of the seat with the adjustable back collapsed.
Figure 6:
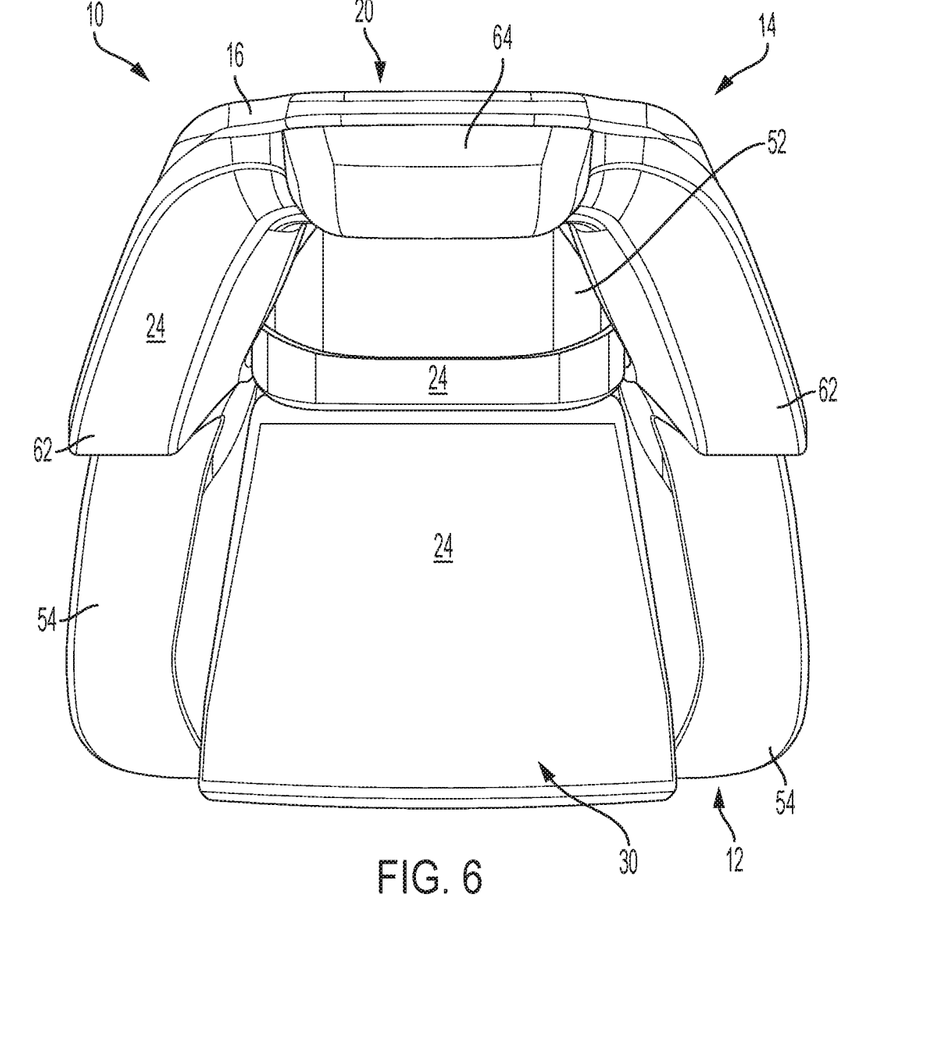
FIG. 6 is a top elevation view of the seat with the adjustable back rotated away from the frame.

In the embodiment seen in FIG. 2, the base bladder 26 includes grooves 56 along the top side or surface facing towards the occupant, of the base bladder. The grooves 56 provide channels to allow and promote water to run off from the top surface of the base bladder 26 and the base 12 and to prevent water build up. If a cover material 24 is used over the base bladder 26, the cover material may become taught on the upper surface of the base bladder as the base bladder is inflated. The grooves 56 provide a route for the water that penetrates the cover material 24 to flow through and drain off of the base 12 even if the cover material is taught on the upper surface of the base bladder. The frame 16 may also have holes 58 as seen in FIGS. 7 and 9 to allow or permit water to drain from the frame 16 and seat 10. The grooves 56 additionally help inhibit the base bladder 26 from doming upward when inflating, thereby providing greater comfort to the seat occupant.

In the embodiment seen in FIG. 2, the base bladder 26 also includes a central tube or opening 60 formed therein. The central opening 60 provides additional support, integrity and comfort for the base bladder 26. For example, the central opening helps further prevent the base bladder from doming when inflated. The central opening 60 also creates a fluidly connected first interior portion on a first side of the central opening and a second interior portion on a second side of the central opening in the base bladder 26 and allows air inside the base bladder to move between the two portions to better support an occupant, for example, when making a sharp turn.

Although, in one embodiment, the base bladder 26 is formed by rotomolding a polyvinyl chloride and the back bladder 32 is formed from a thermoplastic polyurethane with radio frequency welding, other materials and methods for forming bladders are known in the art, including blowmolding, which could be used without defeating the spirit of the invention.

In some embodiments, such as the one shown in FIG. 1, the frame 16 includes side members 62 on opposite sides of the back bladder 32. The side members 62 may protrude from the sides of the frame 16 to provide lateral support to the upper body of an occupant, such as preventing the occupant from sliding off the seat.

In some embodiments, the seat 10 includes a headrest 64 which may be connected to the frame 16 or the adjustable back 14. In some embodiments, the headrest 64 may be integrated with the frame 16 as seen in FIG. 1. The headrest 64 could also be attached or integrated with the back board 40 such that the headrest 64 moves with the back board. In the embodiment seen in FIG. 1, the headrest has a foam material 22 layer and is covered by a cover material 24 much like the lower back portion 44.

The seat 10 also includes a means for adjusting the amount of air in the back bladder 32 and/or base bladder 26. In the embodiment seen in FIG. 7, the seat 10 includes a back panel 66 that is removably attached to and covers the opening in the back of the frame 16. In the embodiment seen in FIG. 7, the back panel 66 is selectively attached to the frame 16 by fasteners 36, e.g. Christmas tree clips. However, alternative methods of removably attaching a panel to a frame are known in the industry, e.g. screws, bolts, hooks and loops, pins, etc., the use of which would not defeat the spirit of the invention.

Figure 10:
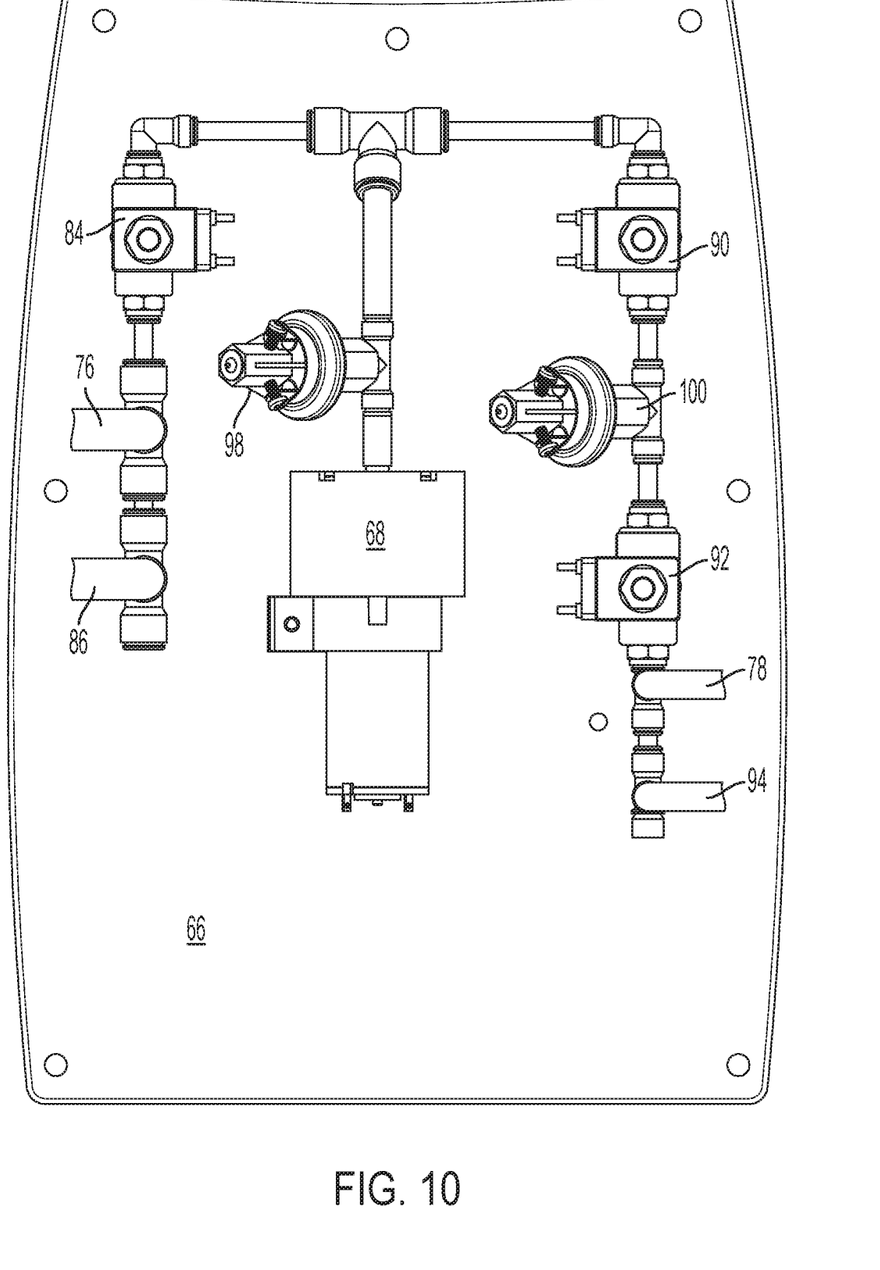
FIG. 10 is an elevation view of the back panel.

In the embodiment seen in FIG. 10, the back panel 66 includes an air compressor or motor 68, solenoids 84, 90, 92, to inflate or deflate the adjustable base 12 and/or the adjustable back 14, and a pressure relief valve or switch 100. Attaching such components to the removable panel 66 protects the components during use by locating them in the cavity of the frame 16, while also providing easy access if maintenance is required. However, other locations for mounting solenoids and/or air compressor are known in the art, e.g. remote from the seat, under the seat, etc., the use of which would not defeat the spirit of the invention.

The seat 10 also includes controls for an occupant to adjust the amount of air in the back bladder 32 and/or base bladder 26. In the embodiment seen in FIG. 1, switches are attached to a switch plate 70 attached to the frame 16 and are electronically connected to the solenoids 84, 90, 92 and/or 96 and air compressor 68 and accessible to the seat occupant to inflate or deflate the adjustable base 12 and/or the adjustable back 14. In one embodiment the switches are double pole, double throw switches with a momentary on (forward), off, momentary on (rearward) setting located on one side of the seat 10. Other acceptable switches are known in the industry, e.g., toggle, touch screen, single pole double throw, etc., the use of which would not defeat the spirit of the invention. In the embodiment seen in FIG. 1, the switches are at a slight angle to make their use more convenient to the occupant of the seat and/or to provide space for the switches and wires in the shell 16.

In one embodiment, a first switch 72 of the switches inflates and deflates the adjustable back 14, while second switch 74 of the switches inflates and deflates the adjustable base 12. However, other switches and switch configurations are known in the art, e.g. separate switches for each bladder and each function or a switch for both bladders for each function, the use of which would not defeat the spirit of the invention.

Referring to FIG. 10, each of the back bladder 32 and base bladder 26 are fluidly connected to at least one of the solenoids, such as by back tubing 76 or base tubing 78. In one embodiment, the back bladder 32 is connected to the back tubing 76 by a barbed fitting 80 on the rear of the bladder, as seen in FIG. 7, and the base bladder 26 is connected to the base tubing 78 by a push to connect fitting 82. However, other types of fittings are known in the art e.g. a threaded fitting, a welded tube, etc., the use of which would not defeat the spirit of the invention. Further, in one embodiment, different size tubing is used for the back tubing 76 and base tubing 78 such that during manufacture, installation and maintenance, the back tubing can be easily differentiated from the base tubing.

When the power is supplied through activation or employment of one of the switches 72, 74, for example, by being in the forward position or moved in a first direction, the air compressor 68 is turned on and is fluidly connected and supplies compressed air to two of the solenoids, the first solenoid of each fluid line, one going to the back bladder 32 and one to the base bladder 26. Power could be supplied by connecting the seat 10 to a power source of the vehicle or a battery or other energy source, for example solar power, could be attached to the seat 10 and used to power the seat.

Activation of one of the switches may also open one of the solenoids to fluidly connect the compressor 68 and allow the compressed air to flow into the designated bladder. The air compressor 68 and solenoid will remain operating and open during the duration the switch in the on position. Once released, the switch will return to an off position cutting power to the air compressor 68 and closing the solenoid(s).

Although there are many ways in which the switches, solenoids and air compressor 68 could be configured, which would be known in the art and the use of which would not defeat the spirit of the invention, in one embodiment, the power, for example from the vehicle, is ran to a first switch 72 of the plurality of switches. From the first switch 72, the power is ran to a first back solenoid 84 of the solenoids and the air compressor 68. In this configuration, turning the first switch 72 to the forward position powers and operates the air compressor 68 and opens the first back solenoid 84 to inflate the back bladder 32 through the first back tubing 76.

In the embodiment seen in FIG. 10, there is a second back tubing 86 that runs from the back bladder 32 to the first back solenoid 84 for exhausting air or deflating the back bladder. In order to deflate the back bladder 32, the first switch 72 is turned to the rearward position or moved in a second direction, wherein the power is run from the first switch to the first back solenoid 84 which opens the first back solenoid. The pressure from the inflated back bladder 32 and, optionally, the webbing 52, hinge 42 and/or the occupant, is greater than the outer environment and the air from the back bladder moves to the outer environment through the second back tubing 86 and the first back solenoid to deflate the back bladder.

Figure 11:
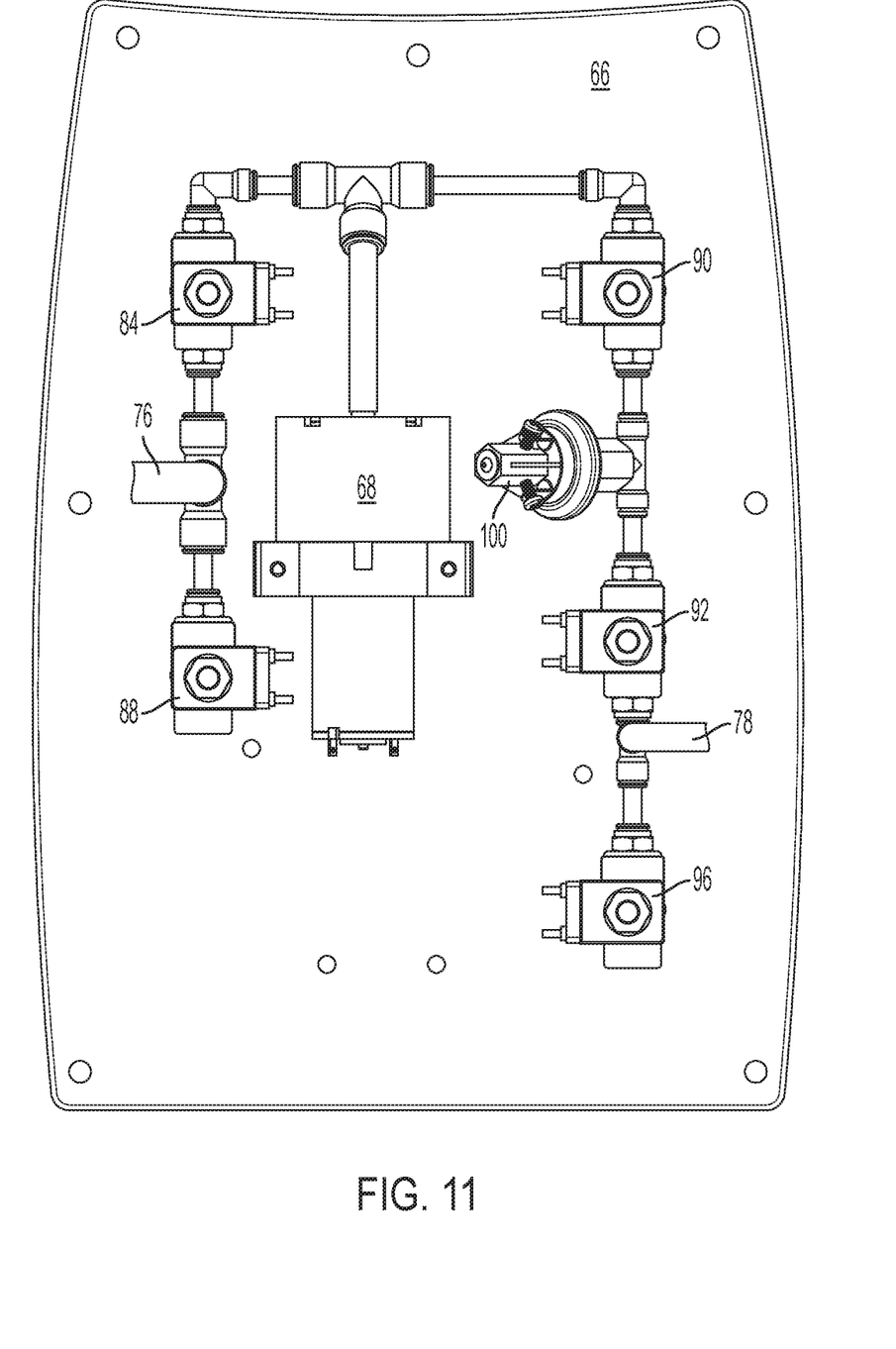
FIG. 11 is an elevation view of an alternative embodiment of the back panel.

Alternatively, instead of a second back tubing 86, a second back solenoid 88 can be used. As seen in FIG. 11, when the first switch 72 is turned to the rearward position, power is run from the first switch to a second back solenoid 88, which opens the second back solenoid to allow air to exit the back bladder 32 through the back tubing 76 and second back solenoid.

In one embodiment, power is also run to a second switch 74. From the second switch 74, the power is run to a first base solenoid 90, second base solenoid 92 and air compressor 68. In this configuration, employing the second switch 74, for example, by moving or turning to the forward position, powers and operates the air compressor 68 and opens the first base solenoid 90 and second base solenoid 92 to inflate the base bladder 26 through the base tubing 78.

In the embodiment seen in FIG. 10, there is a second base tubing 94 that runs from the base bladder 26 to the second base solenoid 92 for exhausting air or deflating the base bladder. In order to deflate the base bladder 26, the second switch 74 is turned to the rearward position wherein the power is run from the second switch to the second base solenoid 92, which opens the second base solenoid. The air from the inflated base bladder 26 moves to the outer environment with less pressure through the second base tubing 94 and the second base solenoid 92 to deflate the base bladder 26. The weight of the occupant will also help exhaust the base bladder 26 when the second base solenoid 92 is opened.

Alternatively, instead of a second base tubing 94, a third base solenoid 96 can be used. As seen in FIG. 11, when the second switch 74 is turned to the rearward position, power is run from the second switch to a third base solenoid 96 which opens the third base solenoid to allow air to exit the base bladder 26 through the first base tubing 78 and third base solenoid.

Although there are many ways in which the solenoids, air compressor 68 and back bladder 32 and/or base bladder 26 could be configured, which would be known in the art and the use of which would not defeat the spirit of the invention, in one embodiment seen in FIG. 10, at least one pressure relief valve 98 is fluidly connected to at least one of the solenoids and the air compressor 68. The pressure relieve valve 98 prevents the back bladder 32 and/or base bladder 26 from being over inflated by limiting the amount one or both of the bladders can be inflated and from creating strain on the air compressor 68 solenoids or fluid line.

In the embodiment seen in FIG. 10, the fluid line exits the air compressor 68 and is connected to a first pressure relief valve 98 after which the fluid line splits to the first back solenoid 84 and first base solenoid 90. The first pressure relieve valve 98 could be set to any pressure, for example, based upon the air compressor 68, solenoids, bladders 26, 32 and/or fluid line used, but in one embodiment is set at 12-15 psi. From the first back solenoid 84, the fluid line runs through the back tubing 76 to the back bladder 32 and may include the use of a plug at the end of the line.

From the first base solenoid 90, the fluid line runs to a second pressure relief valve 100. The second pressure relieve valve 100 prevents the base bladder 26 from being over inflated or over pressurized, from, for example, an occupant bouncing on the seat 10. Such use of a pressure relieve valve permits the base bladder 26 to be inflated to a different pressure than the back bladder 32. From the second pressure relief valve 100 the fluid line runs through the second base solenoid 92 and then through the back tubing 76 to the base bladder 26 may include the use of a plug at the end of the line.

The second or base pressure relieve valve 100 could be set to any pressure, for example, based upon the material or construction of the base bladder 26 or likely forces to be applied to the base bladder, but in one embodiment is set at 2-2.5 psi. If the desired pressure for both the back bladder 32 and base bladder 26 are the same, the second pressure relieve valve 100 and second base solenoid 92 could be eliminated.

Alternatively, the air compressor 68 could be selected such that its top output is close to the maximum desired pressure of the back bladder 32 and/or base bladder 26, thereby obviating the need for a two pressure valves. For example, in FIG. 11, there is no pressure relief valve in the fluid line to the first back solenoid 84 because the peak output of the air compressor 68 is the same or less than the maximum desired pressure of the back bladder 32.

In one embodiment, the second pressure relief value 100 and/or first pressure relief valve 98 could be an electromechanical relief valve such that when the threshold pressure is reached the in the base bladder 26 and/or back bladder 32, for example, by the pressure relief valve detecting that the amount such bladder(s) can be inflated is reached, the pressure relief value turns the compressor 68 off or sends a signal to turn the compressor off. However, other pressure relief valves could be used, for example, mechanical pressure relief values, without defeating the spirit of the invention.

The first base solenoid 90 is used to prevent the second pressure relief valve 100 from being falsely triggered when it is desired to fill the back bladder 32, which has a higher desired pressure range than the second pressure relief valve is set at.

When power is supplied to the air compressor 68 and first back solenoid 84, such as by moving the first switch 72 to the forward or on position, the back bladder 32 will inflate causing the back board 40 to pivot about the joint or hinge 42. When the desired angle is generated by the back bladder 32 and back board 40, the occupant can stop the flow of air by releasing the first switch 72.

Similarly, when power is supplied to the air compressor 68 and first base solenoid 90 and second base solenoid 92, such as by moving the second switch 74 to the forward or on position, the base bladder 26 will inflate. When the desired pressure is generated by the base bladder 26, for example, such that the jarring and jostling is dampened, the occupant can stop the flow of air by releasing the second switch 74.

As such, an occupant of the seat can obtain the desired amount of support by using the switches to inflate or deflate the back bladder 32 and/or the base bladder 26 as rough terrain is encountered. The occupant can remain seated and/or seat belted without having to slow the vehicle down to adjust the back bladder 32 and/or the base bladder 26.

Although the back bladder 32 and base bladder 26 are filled with air in the embodiment described above, the bladders could be filled with other materials known in the art, such as a gel or foam, to create varying densities depending on damping requirements, the use of which would not defeat the spirit of the invention.

With the advancement in the watercraft field, several companies have introduced products to the field to help lessen the discomfort of the occupants while the vehicle is used on rough terrain or water. Some current products use mechanical devices such as springs and shocks which are typically mounted to the pedestal of the seat, as in helm chairs and standard fishing seats, and compress when forces are applied to the base of the seat by the occupant in a downward movement. Such products suffer from a number of disadvantages.

One such disadvantage is that since the springs and shocks only provide reductions when force is applied to the seat base in the downward motion, an occupant will still feel the forward and backward movement experienced in the rough terrain or water.

Another disadvantage is that once the springs or shocks are compressed and the downward force stops or is lessened, the springs or shocks will push the occupant upward, which may cause the occupant to become airborne, in unwanted movement and/or injury.

Some companies have introduced products to the field to help lessen the discomfort of the occupants while the vehicle is used on rough terrain by utilizing an adjustable seat back to provide support to occupants. However, such products also suffer from a number of disadvantages.

One such disadvantage is that the seat back must be adjustable prior to and/or after movement of the vehicle. For example, if the occupant encounters rough terrain or water conditions during movement of the vehicle, the vehicle's speed must be reduced such that the occupant can get out of the seat and safely adjust the seat back to a proper braced position without be jarred, jostled or thrown around the vehicle.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A seat for a vehicle, the seat comprising:
    a frame;
    a base attached to the frame;
    a back rotatably attached to the frame at a location adjacent the base, the back having an exterior side configured to support an occupant; and
    a first bladder positioned between the frame and the back;
    wherein when the first bladder is inflated, a top of the exterior side of the back rotates away from the frame about the location.

2. The seat of claim 1 further comprising an air compressor fluidly connected to the first bladder to inflate the first bladder.

3. The seat of claim 2 further comprising a switch electronically connected to the air compressor and configured to inflate and deflate the first bladder.

4. The seat of claim 1 wherein the base includes a second bladder.

5. The seat of claim 4 wherein the base includes a leg bolster.

6. The seat of claim 4 wherein the second bladder includes grooves along a top side of the second bladder;
    wherein the grooves are configured to allow water to drain off of the base; and
    wherein a hole formed in the frame allows water to drain off of the frame.

7. The seat of claim 6 further comprising a central opening formed in the second bladder;
    wherein the second bladder has a first interior portion on a first side of the central opening and a second interior portion on a second side of the central opening; and
    wherein the first interior portion and second interior portion are fluidly connected such that air can move between the first interior portion and second interior portion.

8. The seat of claim 4 further comprising:
    an air compressor fluidly connected to the first bladder and the second bladder; and
    a first switch and a second switch electronically connected to the air compressor;
    wherein the first switch is configured to inflate and deflate the first bladder and the second switch is configured to inflate and deflate the second bladder.

9. The seat of claim 1 wherein the first bladder is attached to the frame and the back.

10. A chair comprising:
a shell having a base portion and a back portion;
a base attached to the base portion of the shell;
a back pivotally connected to the shell at a hinge adjacent a bottom end of the back portion of the shell; and
a back inflatable member attached to the back portion of the shell;
wherein when the back portion of the shell is stationary;
wherein when the back inflatable member is inflated, the back pivots around the hinge and away from the shell; and
wherein the back is configured to be rotated between a first position that is backwards of vertical position and a second position that is forwards of the vertical position.

11. The chair of claim 10 wherein the back further comprises
a board;
a compressible material connected to the board; and
a cover material;
wherein the cover material wraps over a top of the compressible material and is attached to a backside of the board to connect the compressible material to the board.

12. The chair of claim 10 further comprising:
a panel removably attached to the shell;
at least one solenoid attached to the panel and fluidly connected to the back inflatable member;
a motor attached to the panel and fluidly connected to the at least one solenoid; and
a first switch electronically connected to the motor and at least one solenoid;
wherein when the panel is attached to the shell, the at least one solenoid and the motor are located in a cavity formed in the shell; and
wherein when the first switch is moved in a first direction, the motor is turned on and the at least one solenoid is opened such that the back inflatable member is inflated and when the first switch is moved in a second direction, the at least one solenoid is opened such that the back inflatable member is deflated.

13. The chair of claim 12, further comprising a pressure relief valve fluidly connected to the motor, the pressure relief valve configured to limit an amount the back inflatable member can be inflated.

14. The chair of claim 13 wherein the pressure relief valve is electronically connected to the motor and when the pressure relief valve detects that the amount the back inflatable member can be inflated is reached, the pressure relief valve sends a signal to turn the motor off.

15. The chair of claim 10, wherein the base further comprises:
a board;
a compressible material attached to the board; and
a base inflatable member attached to the board;
wherein a cover material covers a top of the compressible material and a top of the base inflatable member and is connected to the board to attach the compressible material and second inflatable member to the board.

16. The chair of claim 15 wherein the top of the base inflatable member has grooves such that water that penetrates the cover material is permitted to drain off of the base.

17. A chair for a boat, the chair comprising:
a frame having an opening formed therein;
an adjustable back rotatably attached to the frame and having a back bladder;
an adjustable base attached to the fame and having a base bladder;
a back panel configured to cover the opening when the back panel is selectively attached to the frame;
a compressor attached to the back panel;
a first solenoid attached to the back panel and fluidly connected to the compressor and the back bladder;
a second solenoid attached to the back panel and fluidly connected to the compressor and the base bladder;
a first switch electronically connected to the compressor and first solenoid;
a second switch electronically connected to the compressor and second solenoid;
wherein when the first switch is employed, the compressor is turned on and the first solenoid is opened such that the back bladder is inflated and the adjustable back is rotated away from the frame;
wherein when the second switch is employed, the compressor is turned on and the second solenoid is opened such that the base bladder is inflated;
wherein the back bladder may be inflated to a different pressure than the base bladder;
wherein the adjustable back is configured to be rotated between a first position that is backwards of a vertical position and a second position that is forwards of the vertical position;
wherein when the adjustable back is in the second position, the frame is backwards of a vertical position; and
wherein when the back panel is attached to the frame, the compressor, first solenoid and second solenoid are located with the cavity.

18. A seat for a vehicle, the seat comprising:
a stationary frame;
a base attached to the stationary frame;
a back attached to the stationary frame by a hinge; and
a bladder positioned between the stationary frame and the back;
wherein the back is in a first position when the bladder is inflated and the back is in a second position when the bladder is not inflated; and
wherein when the back is in the first position, a top of the back is forward a rear of the base and the first portion of the stationary frame remains rearward of the rear of the base.

* * * * *

UNITED STATES PATENT AND TRADEMARK OFFICE
CERTIFICATE OF CORRECTION

PATENT NO. : 10,525,854 B2
APPLICATION NO. : 16/233599
DATED : January 7, 2020
INVENTOR(S) : Alexander et al.

Page 1 of 1

It is certified that error appears in the above-identified patent and that said Letters Patent is hereby corrected as shown below:

In the Claims

Column 12
Line 11, the word --frame-- should replace the word "fame"

Signed and Sealed this
Eighteenth Day of February, 2020

Andrei Iancu
*Director of the United States Patent and Trademark Office*